United States Patent
Okanobu

(12) 
(10) Patent No.: US 6,813,310 B1
(45) Date of Patent: Nov. 2, 2004

(54) RECEIVER AND IC THEREOF CAPABLE OF RECEIVING ANALOG BROADCAST AND DIGITAL BROADCAST

(75) Inventor: Taiwa Okanobu, Tokyo (JP)

(73) Assignee: Sony Corporation, Tokyo (JP)

( * ) Notice: Subject to any disclaimer, the term of this patent is extended or adjusted under 35 U.S.C. 154(b) by 780 days.

(21) Appl. No.: 09/665,455

(22) Filed: Sep. 19, 2000

(30) Foreign Application Priority Data

Sep. 20, 1999 (JP) .......................................... P11-264747

(51) Int. Cl.$^7$ ............................ H03M 1/00; H03M 7/02
(52) U.S. Cl. ........................ 375/216; 375/344; 375/324; 375/329; 370/478; 329/306
(58) Field of Search ................................. 375/216, 260, 375/296, 340, 346, 365, 324, 329, 344; 370/478; 455/73, 324, 552.1; 710/62; 329/306

(56) References Cited

U.S. PATENT DOCUMENTS 6,286,063 B1 * 9/2001 Bolleman et al. ............. 710/62
6,308,057 B1 * 10/2001 Hayashi ....................... 455/324
6,487,219 B1 * 11/2002 Snider .......................... 370/478

* cited by examiner

Primary Examiner—Young T. Tse
Assistant Examiner—Edith Chang
(74) Attorney, Agent, or Firm—Jay H. Maioli

(57) ABSTRACT

A receiver is equipped with a demodulation circuit for taking a signal indicating broadcast contents of an analog broadcast out of the first and second intermediate-frequency signals, and for taking a signal indicating broadcast contents of a digital broadcast out of the first and second intermediate-frequency signals. Frequencies of local oscillation signals are made to be a first frequency within a frequency band of the digital broadcast adjacent to a frequency band of the analog broadcast received by the receiver at a time of receiving the analog broadcast, and the frequencies of the local oscillation signals are made to be a second frequency equal to the carrier frequency of the analog broadcast adjacent to the frequency band of the digital broadcast received by the receiver at a time of receiving the digital broadcast.

14 Claims, 5 Drawing Sheets

FIG. 3A  $S_{RX}$
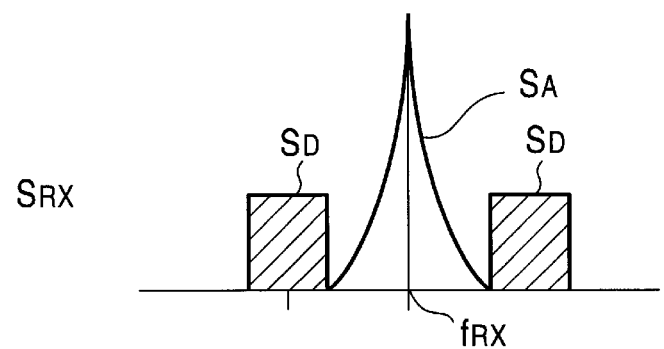
FIG. 3B  $S_{LO1I}$ $S_{LO1Q}$
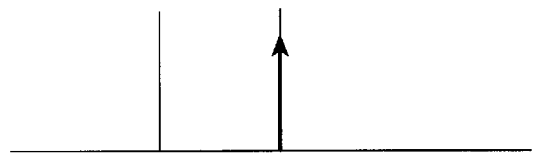
FIG. 3C  $S_{LO1I}$ $S_{LO1Q}$
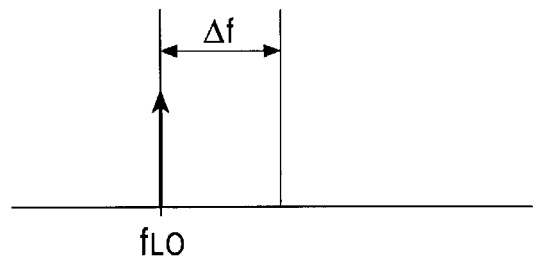
FIG. 3D  $S_{IF1I}$ ($S_{IF1Q}$)
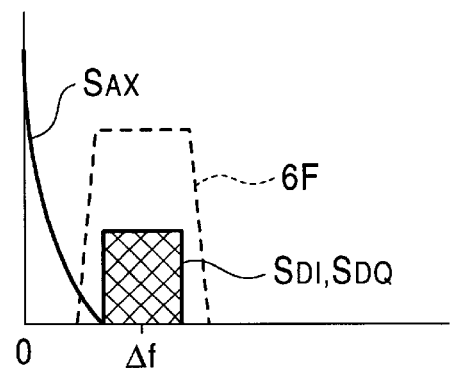
FIG. 3E  $S_{IF1I}$ $S_{IF1Q}$
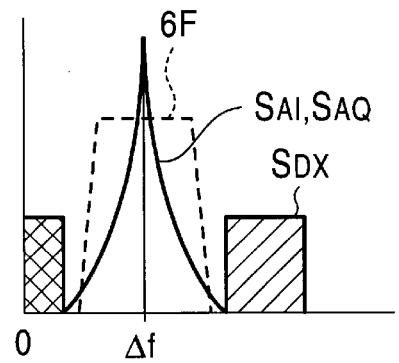

RECEIVER AND IC THEREOF CAPABLE OF RECEIVING ANALOG BROADCAST AND DIGITAL BROADCAST

BACKGROUND OF THE INVENTION

1. Field of the Invention

The present invention relates to a receiver capable of receiving an analog broadcast and a digital broadcast and an integrated circuit (IC) for the same.

2. Description of Related Art

In the current amplitude modulation (AM) broadcast and the current frequency modulation (FM) broadcast, the processing of materials to be broadcast is being digitized. However, the broadcasts themselves are performed in an analog system.

However, if the broadcasts themselves are digitized, a broadcast in high sound quality can be supplied, and additional data service and the like can be enabled, and further the efficiency of frequency utilization can be improved. Accordingly, a digital broadcast, in which broadcast themselves are digitized, is now under consideration.

However, it is a matter of course that a digital broadcast receiver is newly required in place of a conventional analog broadcast receiver for receiving the digital broadcast. On the other hand, it is desirable to change over from the analog broadcast to the digital broadcast smoothly without any resistance. Consequently, the coexistence of the former analog broadcast and the new digital broadcast is required during the period of the changeover.

There is the IBOC (In-Band On Channel) system as a broadcast system enabling the coexistence. The IBOC system realizes the coexistence by employing a frequency disposition of the analog broadcast and the digital broadcast as shown in FIG. 4A, for example.

That is, in FIG. 4A, a reference code $S_A$ indicates a broadcast wave signal of a conventional analog FM broadcast, or an FM signal. The carrier frequency of the broadcast wave signal $S_A$ is a frequency $f_{RX}$. In a case of making a digital broadcast wave signal coexist with the analog broadcast wave signal $S_A$, two digital broadcast wave signals $S_D$ are disposed adjacently to the both side frequency bands of the broadcast wave signal $S_A$.

However, there is a case where only one of the two digital broadcast wave signals $S_D$ is used. In addition, the levels of the digital broadcast wave signals $S_D$ are set to be lower than that of the analog broadcast wave signal $S_A$ by about 15 dB–20 dB. The program contents of the digital broadcast wave signals SD are generally the same as those of the analog broadcast wave signal $S_A$.

In future, the analog broadcast wave signal $S_A$ will be stopped from being broadcast, and only the digital broadcast wave signal $S_D$ will be broadcast. Or, the frequency band of the analog broadcast wave signal $S_A$ will be used by the digital broadcast. Incidentally, it is regarded that it will take from ten years to fifteen years to change over from the analog broadcast to the digital broadcast.

For coping with the aforesaid coexistence of the analog broadcast and the digital broadcast, a receiver that can be used during the changeover period and after it, namely, a hybrid receiver that can receive both of the analog broadcast and the digital broadcast, is required.

The hybrid receiver can be constructed as shown in FIG. 5, for example. For simplifying the situation, it is supposed that the analog broadcast wave signal $S_A$ and both the digital broadcast wave signals $S_D$ are broadcast as shown in FIG. 4A. The antenna 1 receives these signals $S_A$ and $S_D$. Then, the received signals $S_A$ and $S_D$ are supplied to a mixer circuit 5 though a signal line composed of an antenna tuning circuit 2, a high frequency amplifier 3 and an interstage tuning circuit 4 in the order. On the other hand, a local oscillation circuit 6 forms a local oscillation signal $S_{LO}$ having a predetermined frequency, and the formed local oscillation signal $S_{LO}$ is also supplied to the mixer circuit 5.

Thus, the frequency conversion of the received signals $S_A$ and $S_D$ are performed in the mixer circuit 5 by means of the local oscillation signal $S_{LO}$. As a result of the frequency conversion, as shown in FIG. 4B, the received signals $S_A$ and $S_D$ are converted to intermediate-frequency signals $S_{AI}$ and $S_{DI}$ in which the carrier frequency $f_{RX}$ of the signal $S_A$ becomes a predetermined intermediate frequency $f_{IF}$. The converted intermediate-frequency signals $S_{AI}$ and $S_{DI}$ are then supplied to a band-pass filter 7. The band-pass filter 7 works as an intermediate-frequency filter and has a wide frequency band passing characteristic as shown by a dashed line 7F in FIG. 4B. Then an output of the band-pass filter 7 is supplied to a band-pass filter 9A and a band-elimination filter 9D through an AGC amplifier 8.

In this case, the band-pass filter 9A is used for eliminating an adjacent disturbance wave signal, and has a center frequency of a frequency $f_{IF}$ and a pass band corresponding to the intermediate-frequency signal $S_{AI}$, as shown by a dashed line 9AF in FIG. 4C. Consequently, the intermediate-frequency signal $S_{AI}$ of the analog broadcast is taken out of the band-pass filter 9A.

Besides, the band-elimination filter 9D is used for attenuating the analog intermediate-frequency signal $S_{AI}$, and has a center frequency of a frequency $f_{IF}$ and an elimination band same as the frequency band of the intermediate-frequency signal $S_{AI}$, as shown by dashed lines 9DF in FIG. 4D. Consequently, the intermediate-frequency signals $S_{DI}$ of the digital broadcast are taken out of the band-elimination filter 9D.

Accordingly, when only the analog broadcast is broadcast or when both of the analog broadcast and the digital broadcast are broadcast, the analog broadcast can be heard by demodulating the intermediate-frequency signal $S_{AI}$ outputted from the band-pass filter 9A.

On the other hand, when only the digital broadcast is broadcast or when both of the analog broadcast and the digital broadcast are broadcast, the digital broadcast can be heard by decoding the intermediate-frequency signals $S_{DI}$ outputted from the band-elimination filter 9D.

Consequently, any one of the analog broadcast and the digital broadcast in conformity with the IBOC system can be heard by means of the receiver shown in FIG. 5. Furthermore, the receiver can be used as it is even if only the digital broadcast is broadcast in future.

However, the pass band width of the band-pass filter 7 should be wide for taking out the two kinds of the intermediate-frequency signals $S_{AI}$ and $S_{DI}$. On the other hand, the band-pass filter 7 should eliminate disturbance wave signals from adjacent channels. As a result, the ratio band, i.e. a ratio of a cutoff frequency band to a pass frequency band, becomes small. Consequently, the requirements for the band-pass filter 7 become strict. As a result, the order and/or the scale of the band-pass filter 7 becomes large.

Furthermore, because the band-pass filter 9A and the band-elimination filter 9D are required in addition to the band-pass filter 7, many filters become necessary.

Consequently, the increase of consumption current owing to the increase of the circuit scale, the increase of the size of a receiver, the increase of costs, and the like are incurred.

SUMMARY OF THE INVENTION

The present invention aims to solve the aforesaid problems. That is, the present invention aims to provide a receiver and an IC that can receive the analog broadcast and the digital broadcast, and that can make the ratio of the band-pass filter for taking out an object intermediate-frequency signal not to be small for preventing the order and scale of the bandpass filter from increasing, and further that can prevent the increase of the circuit scale, the increase of the size of a receiver, the increase of costs, and the like.

According to a first aspect of the present invention, there is provided a receiver for a broadcast system in which a broadcast wave signal of an analog broadcast and a broadcast wave signal of a digital broadcast are transmitted in frequency bands adjacent to each other, comprising: mixer means, to which a received signal and a local oscillation signal are supplied, and which performs a frequency conversion of the received signal to an intermediate-frequency signal by means of the local oscillation signal; filter means which takes the intermediate-frequency signal out of an output signal of the mixer means; and demodulation means which takes a signal indicating broadcast contents out of the intermediate-frequency signal taken out by means of the filter means, wherein: at a time of receiving the analog broadcast, a frequency of the local oscillation signal is made to be a first frequency within a frequency band of the digital broadcast adjacent to a frequency band of the analog broadcast received by the receiver, and the signal taken out by said modulating means is a signal indicating the contents of the analog broadcast, and, at a time of receiving the digital broadcast, the frequency of the local oscillation signal is made to be a second frequency equal to a carrier frequency of the analog broadcast adjacent to the frequency band of the digital broadcast received by the receiver, and the signal taken out by said modulating means is a signal indicating the contents of the digital broadcast.

According to a second aspect of the present invention, there is provided a receiver for a broadcast system in which a broadcast wave signal of an analog broadcast and a broadcast wave signal of a digital broadcast are transmitted in frequency bands adjacent to each other, comprising: first and second mixer means, to each of which a received signal and a local oscillation signal are supplied, and each of which performs a frequency conversion of the received signal to first and second intermediate-frequency signals having phases orthogonal to each other by means of the first local oscillation signal; first and second filter means each of which takes the first and second intermediate-frequency signals out of output signals of the first and second mixer means, respectively; demodulation means which takes a signal indicating broadcast contents out of the first and second intermediate-frequency signals taken out by means of the first and second filter means, wherein: at a time of receiving the analog broadcast, a frequency of the local oscillation signal is made to be a first frequency within a frequency band of the digital broadcast adjacent to a frequency band of the analog broadcast received by the receiver, and the signal taken out by said demodulation means is a signal indicating the contents of the analog broadcast, and, at a time of receiving the digital broadcast, the frequency of the local oscillation signal is made to be a second frequency equal to a carrier frequency of the analog broadcast adjacent to the frequency band of the digital broadcast received by the receiver, and the signal taken out by said demodulation means is a signal indicating the contents of the digital broadcast.

According to a third aspect of the present invention, there is provided an IC for a broadcast system in which a broadcast wave signal of an analog broadcast and a broadcast wave signal of a digital broadcast are transmitted in frequency bands adjacent to each other, comprising: mixer means, to which a received signal and a local oscillation signal are supplied, and which performs a frequency conversion of the received signal to an intermediate-frequency signal by means of the local oscillation signal; and filter means which takes the intermediate-frequency signal out of an output signal of the mixer means, wherein: at a time of receiving the analog broadcast, a frequency of the local oscillation signal is made to be a first frequency within a frequency band of the digital broadcast adjacent to a frequency band of the analog broadcast received by the receiver, at a time of receiving the digital broadcast, the frequency of the local oscillation signal is made to be a second frequency equal to a carrier frequency of the analog broadcast adjacent to the frequency band of the digital broadcast received by the receiver, and a signal indicating broadcast contents of one of the analog broadcast and the digital broadcast is taken out of the intermediate-frequency signal taken out by means of the filter means.

According to a fourth aspect of the present invention, there is provided an IC for a broadcast system in which a broadcast wave signal of an analog broadcast and a broadcast wave signal of a digital broadcast are transmitted in frequency bands adjacent to each other, comprising: first and second mixer means, to each of which a received signal and a local oscillation signal are supplied, and each of which performs a frequency conversion of the received signal to a first and second intermediate-frequency signals having phases orthogonal to each other by means of the first local oscillation signal; and first and second filter means each of which takes the first and second intermediate-frequency signals out of output signals of the first and second mixer means, respectively, wherein: at a time of receiving the analog broadcast, a frequency of the first local oscillation signal is made to be a first frequency within a frequency band of the digital broadcast adjacent to a frequency band of the analog broadcast received by the receiver and, at a time of receiving the digital broadcast, the frequency of the first local oscillation signal is made to be a second frequency equal to a carrier frequency of the analog broadcast adjacent to the frequency band of the digital broadcast received by the receiver, and a signal indicating broadcast contents of the one of analog broadcast and the digital broadcast is taken out of the first and second intermediate-frequency signals taken out by means of the first and second filter means.

Accordingly, the analog broadcast is received through the superheterodyne system and the digital broadcast is received through the direct conversion system.

According to the aforesaid aspects of the present invention, an image rejection characteristic and an adjacent disturbance rejection characteristic necessary for receiving an analog broadcast or a digital broadcast can be obtained. In addition, the intermediate frequency can be lowered. Consequently, the receiving circuit including an intermediate-frequency filter can be made to be an IC. Moreover, almost all of the circuits can be shared in a case of installing them in an IC, and thereby it can be realized to miniaturize the shape thereof and to lower the price thereof.

Furthermore, the frequency bandwidths to be dealt with in a main signal line are the same at the time of receiving the digital broadcast and at the time of receiving the analog broadcast. Consequently, it becomes easy to process signals. Besides, the ratio band of the band-pass filter for taking out an object intermediate-frequency signal does not become small, and then the order and scale of the band-pass filter are realized to be small.

Furthermore, even if the analog broadcast wave signal is stopped and the frequency band of the analog broadcast wave signal is used for the digital broadcast in future, the present invention can cope with such a case as a receiver and an IC exclusive to the digital broadcast only by modifying the passing band of the band-pass filter.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which:

FIGS. 3A to 3E are characteristic diagrams showing operations of the embodiment of the present invention;

DESCRIPTION OF THE PREFERRED EMBODIMENTS

Figure 1:
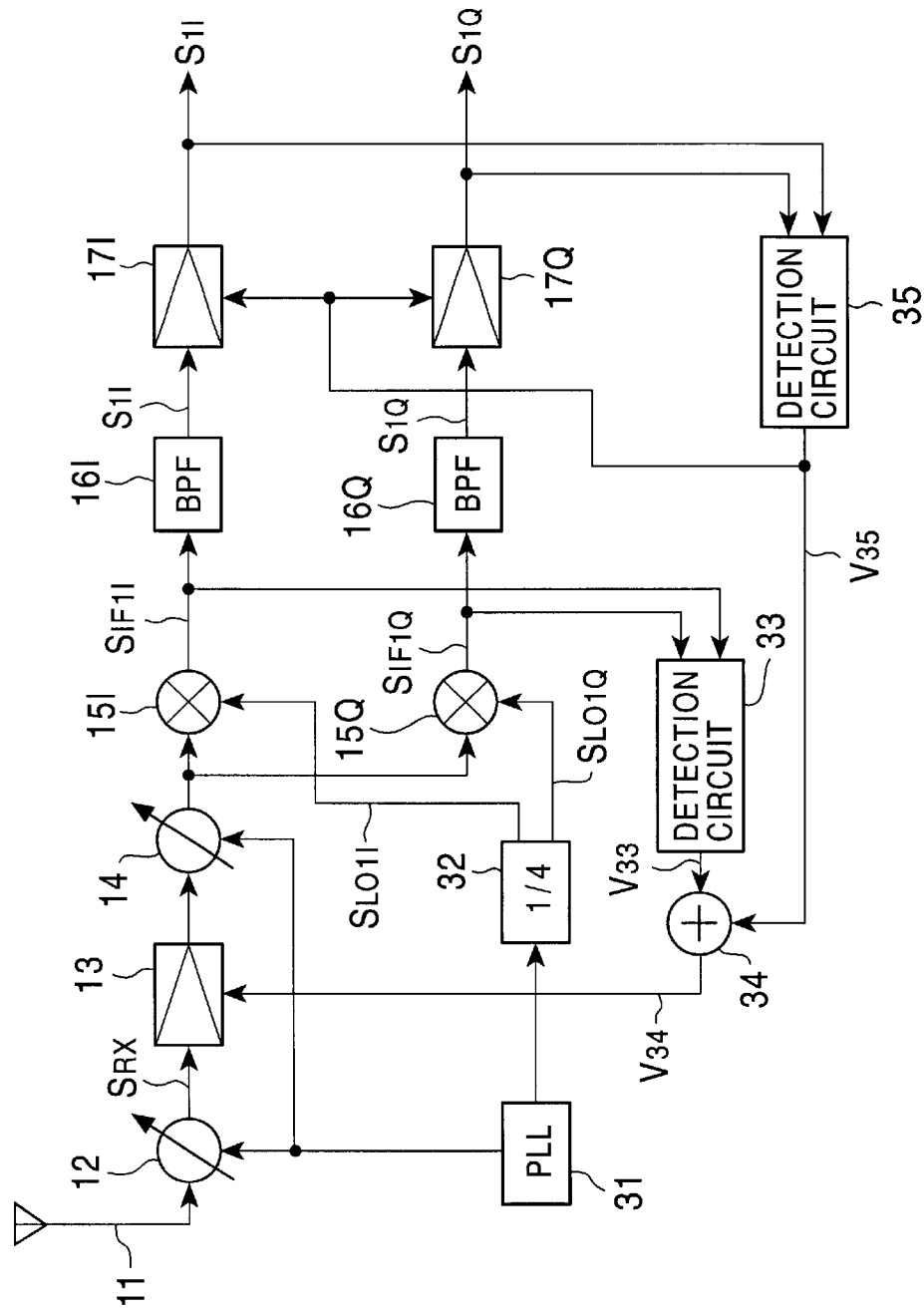
FIG. 1 is a system diagram showing a part of an embodiment of the present invention.
Figure 2:
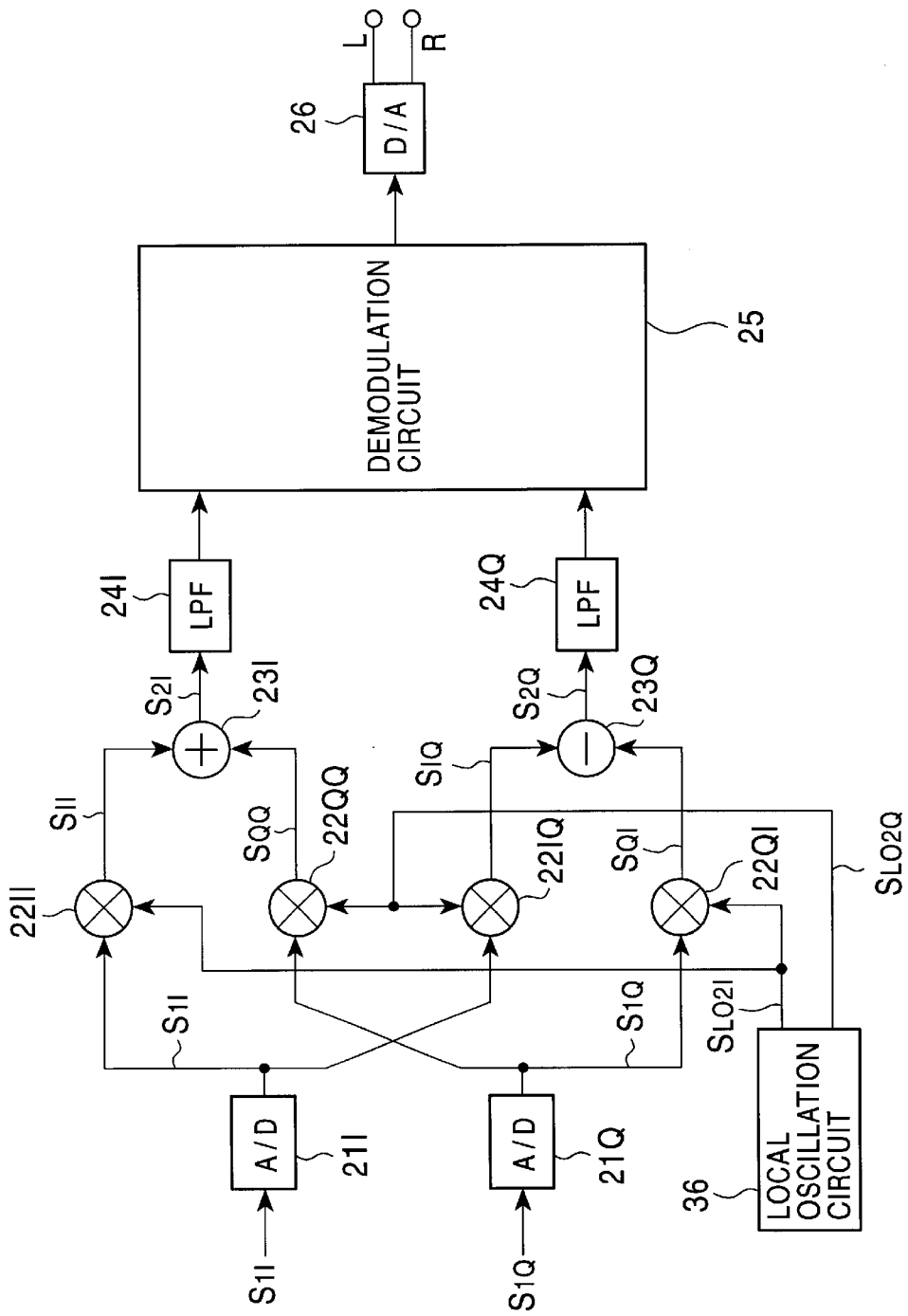
FIG. 2 is a system diagram showing the other part of the embodiment of the present invention.
Figure 4A:
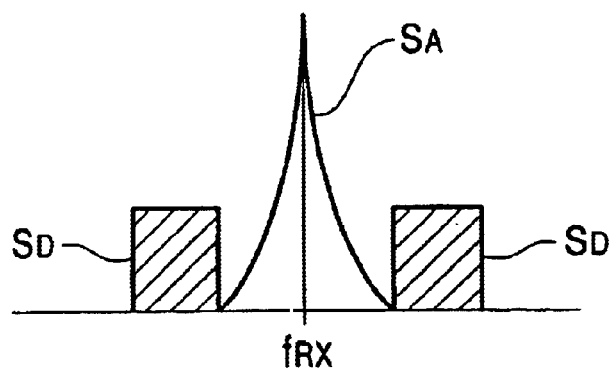
FIGS. 4A to 4D are characteristic diagrams showing the operation of a conventional receiver.
Figure 4B:
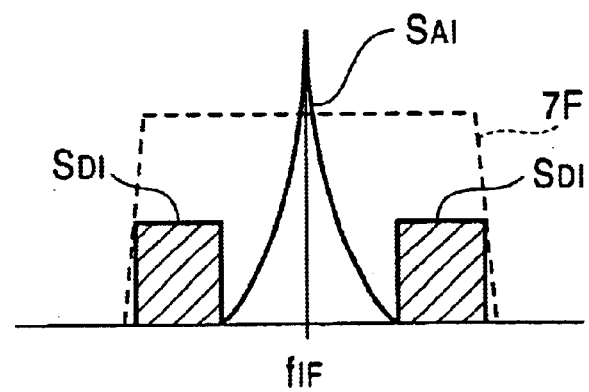
Figure 4C:
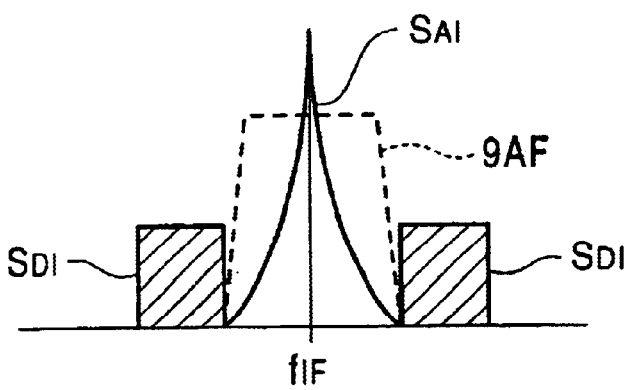
Figure 4D:
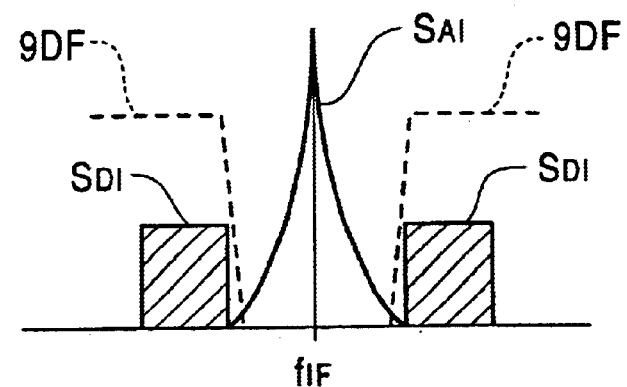
Figure 5:
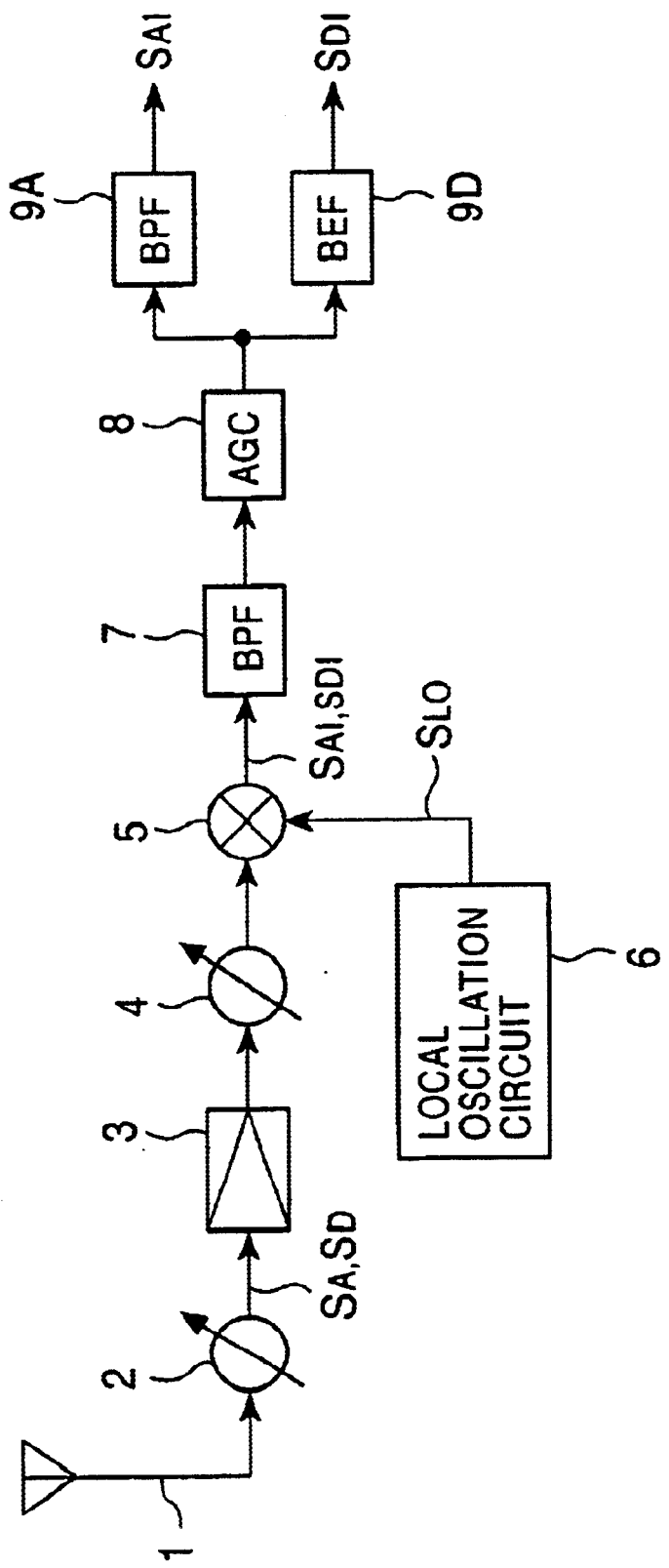
FIG. 5 is a system diagram showing the structure of the conventional receiver the characteristic diagrams of which are shown in FIGS. 4A–4D.

FIGS. 1 and 2 show an embodiment of the present invention applied to a receiver of the IBOC system. Incidentally, FIG. 1 and FIG. 2 are respectively a part of the same receiving circuit divided in two parts for a reason of the size of a sheet of paper, the right side of FIG. 1 continues to the left side of FIG. 2. Furthermore, FIG. 3A shows a broadcast wave signal $S_{RX}$ of the IBOC system. The signal $S_{RX}$ is the same as that illustrated in FIG. 4A.

The receiving circuit shown in FIGS. 1 and 2 exhibits the structure and the operation as a receiving circuit in the direct conversion system when the receiving circuit receives the digital broadcast. That is, an antenna 11 receives a broadcast wave of the IBOC system, and the received signal is supplied to an antenna tuning circuit 12 of an electronic tuning system. Then, as shown in, for example, FIG. 3A, a received signal $S_{RX}$ having a target frequency is taken out, the center frequency of which is supposed to be $f_{RX}$, and the received signal $S_{RX}$ is supplied to first mixer circuits 15I and 15Q through a variable gain amplifier 13 for AGC and an interstage tuning circuit 14 of the electronic tuning system.

Moreover, an oscillation signal having a predetermined frequency is formed in a PLL 31. The formed oscillation signal is supplied to a dividing circuit 32. The dividing circuit 32 divides the supplied oscillation signal into two signals $S_{LO1I}$ and $S_{LO1Q}$ having the same frequency as the center frequency $f_{RX}$ of the received signal $S_{RX}$ and having phases different from each other by an angle of 90° as shown iri FIG. 3B. The divided signals $S_{LO1I}$ and $S_{LO1Q}$ are supplied to the mixer circuits 15I and 15Q, respectively, as first local oscillation signals.

Thus, the first mixer circuits 15I and 15Q execute the frequency conversion of the received signal $S_{RX}$ so that the received signal $S_{RX}$ is converted to first intermediate-frequency signals (base band signals) $S_{IF1I}$ and $S_{IF1Q}$, whose original center frequency $f_{RX}$ has been shifted to zero, as shown in FIG. 3D, by the mixers 15I and 15Q.

In this case, because the center frequency $f_{RX}$ of the received signal $S_{RX}$ and the frequencies of the first local oscillation signals $S_{LO1I\ and\ SLO1Q}$ are the same, signal components on the frequency side lower than the center frequency $f_{RX}$ of the received signal $S_{RX}$ and signal components on the frequency side higher than the center frequency $f_{RX}$ of the received signal $S_{RX}$ are overlapped on each other in the intermediate-frequency signals $S_{IF1I}$ and $S_{IF1Q}$ as shown in FIG. 3D.

In addition, the intermediate-frequency signal $S_{IF1I}$ includes a digital intermediate-frequency signal $S_{DI}$ obtained through the frequency conversion on the digital broadcast wave signal $S_D$ and a signal $S_{AX}$ obtained through the frequency conversion on the analog broadcast wave signal $S_A$. Besides, the intermediate-frequency signal $S_{IF1Q}$ includes a digital intermediate-frequency signal $S_{DQ}$ obtained through the frequency conversion on the digital broadcast wave signal $S_D$ and the signal $S_{AX}$ obtained through the frequency conversion on the analog broadcast wave signal $S_A$. Moreover, the center frequency of the digital intermediate-frequency signals $S_{DI}$ and $S_{DQ}$ is a frequency $\Delta f$. Furthermore, in this case, the signals $S_{IF1I}$ and $S_{IF1Q}$ are in-phase and quadrature signals.

Furthermore, a part of a control voltage to be supplied to a variable-capacitance diode in a VCO, not shown, of the PLL 31 is taken out of the PLL 31, and the taken out control voltage is supplied to the tuning circuits 12 and 14 as a tuning voltage. Thereby, the tuning to the received signal $S_{RX}$ is realized.

Then, the first intermediate-frequency signals $S_{IF1I}$ and $S_{IF1Q}$ from the first mixer circuits 15I and 15Q are supplied to band-pass filters 16I and 16Q, respectively. The band-pass filters 16I and 16Q respectively work as a first intermediate-frequency filter, in which the intermediate frequency $\Delta f$ is set to be a center frequency and a pass band thereof is equal to the occupation band of the digital intermediate-frequency signals $S_{DI}$ and $S_{DQ}$ at the time of receiving the digital broadcast (and the analog intermediate-frequency signals $S_{AI}$ and $S_{AQ}$ at the time of receiving the analog broadcast, which will be described later), as shown by a dashed line 6F in FIG. 3D.

Consequently, the unnecessary signal components, such as the signal $S_{AX}$ and an adjacent disturbance wave signal, of the first intermediate-frequency signals $S_{IF1I}$ and $S_{IF1Q}$, which exist outside of the pass band of the band-pass filters 16I and 16Q are removed by the band-pass filters 16I and 16Q, and the digital intermediate-frequency signals $S_{DI}$ and $S_{DQ}$ are taken out of the band-pass filters 16I and 16Q, respectively, as output signals $S_{1I}$ and $S_{1Q}$ thereof.

Next, the output signals $S_{1I}$ and $S_{1Q}$ (=$S_{DI}$, $S_{DQ}$) outputted from the band-pass filters 16I and 16Q are supplied to A/D conversion circuits 21I and 21Q through variable gain amplifiers 17I and 17Q, respectively. A/D conversions of the supplied signals $S_{1I}$ and $S_{1Q}$ are executed to change the supplied signals $S_{1I}$ and $S_{1Q}$ to digital intermediate-frequency signals $S_{1I}$ and $S_{1Q}$, respectively, by means of the A/D conversion circuits 21I and 21Q. The signals $S_{1I}$ and $S_{1Q}$ after the A/D conversions are supplied to second mixer circuits (22II, 22IQ) and (22QQ, 22QI), respectively. Incidentally, the second mixer circuits 22II–22QI and the latter parts of the receiving circuit from them actually consist of a DSP, however in FIG. 2, the second mixer circuits 22II–22QI and the latter parts are equivalently shown in a form of analog circuits.

Besides, a second local oscillation circuit 36 forms second local oscillation signals $S_{LO2I}$ and $S_{LO2Q}$ having the same frequencies as the drifted frequencies of the first local oscillation signals $S_{LO1I}$ and $S_{LO1Q}$, respectively, and phases different from each other by and angle of 90°. The formed signals $S_{LO2I}$ and $S_{LO2Q}$ are supplied to the second mixer circuits 22II and 22QQ, respectively.

Consequently, the frequency conversions of the intermediate-frequency signals $S_{1I}$ and $S_{1Q}$ are performed at the mixer circuits 22II and 22QQ, respectively, to convert the signals $S_{1I}$ and $S_{1Q}$ into base band signals in which frequency drifts are eliminated, i.e. second intermediate-frequency signals $S_{II}$ and $S_{QQ}$, respectively, which have a center frequencies of zero. Furthermore, in this case, for example, desired wave signal components included in the second intermediate-frequency signals $S_{II}$ and $S_{QQ}$ have the same phase to each other, and image signal components included in the second intermediate-frequency signals $S_{II}$ and $S_{QQ}$ have opposite phases to each other.

Then, the second intermediate-frequency signals $S_{II}$ and $S_{QQ}$ are supplied to an adding circuit 23I. Consequently, a second intermediate-frequency signal $S_{2I}$ in which the image signal components are set off against each other and only the desired wave signal components are included is taken out of the adding circuit 23I.

Besides, the second local oscillation signals $S_{LO2Q}$ and $S_{LO2I}$ from the second local oscillation circuit 36 are supplied to the second mixer circuits 22IQ and 22QI, respectively. Then, the second mixer circuits 22IQ and 22QI eliminate the frequency drifts from the intermediate-frequency signals $S_{1I}$ and $S_{1Q}$, respectively, and perform frequency conversion so as to have second intermediate-frequency signals $S_{IQ}$ and $S_{QI}$ whose center frequencies are zero. Furthermore, in this case, for example, desired wave signal components included in the second intermediate-frequency signals $S_{IQ}$ and $S_{QI}$ have opposite phases to each other, and image signal components included in the signals $S_{IQ}$ and $S_{QI}$ have the same phase to each other.

Then, the second intermediate-frequency signals $S_{IQ}$ and $S_{QI}$ are supplied to a subtraction circuit 23Q. Consequently, a second intermediate-frequency signal $S_{2Q}$ in which the image signal components are set off against each other and only the desired wave signal components are included is taken out of the subtraction circuit 23Q. Incidentally, in these cases, the second intermediate-frequency signals $S_{2I}$ and $S_{2Q}$ have an intermediate-frequency of zero, and their phases are different from each other by and angle of 90°, thus they are in-phase and quadrature signals.

Next, the second intermediate-frequency signals $S_{2I}$ and $S_{2Q}$ are supplied to the demodulation circuit 25 through low-pass filters 24I and 24Q, respectively, for eliminating unnecessary signal components existing outside of the frequency band. The demodulation circuit 25 performs the following demodulation processing at the time of receiving the digital broadcast in accordance with the modulation processing at the time of transmitting the digital broadcast. That is, the processing such as complex Fourier transformation, frequency de-interleave, time de-interleave, selection of digital audio data of a target channel among a plurality of channels, error correction, and data expansion.

Consequently, the digital audio data of a target program among a plurality of programs, or channels, is taken out of the demodulation circuit 25. Then the taken out digital audio data is supplied to a D/A conversion circuit 26, and stereo audio signals L and R are taken out of the D/A conversion circuit 26.

Now, at this time, the intermediate-frequency signals $S_{1I}$ and $S_{1Q}$ outputted from the variable gain amplifiers 17I and 17Q are supplied to an AGC detection circuit 35 to form an AGC voltage $V_{35}$. The formed AGC voltage $V_{35}$ is supplied to the variable gain amplifiers 17I and 17Q as a gain control signal.

In addition, the intermediate-frequency signals $S_{IF1I}$ and $S_{IF1Q}$ outputted from the first mixer circuits 15I and 15Q are supplied to an AGC detection circuit 33 to form a delayed AGC voltage $V_{33}$. The formed AGC voltage $V_{33}$ is supplied to an adding circuit 34, and the AGC voltage $V_{35}$ is also supplied to the adding circuit 34. And then, an addition voltage $V_{34}$ of the AGC voltages $V_{33}$ and $V_{35}$ is taken out of the adding circuit 34. The taken out voltage $V_{34}$ is supplied to the variable gain amplifier 13 as a gain control signal.

Consequently, the automatic gain control of the received signal $S_{RX}$ outputted from the tuning circuit 12 is executed in conformity with the AGC voltage $V_{34}$. In addition, the automatic gain control of the intermediate-frequency signals $S_{1I}$ and $S_{1Q}$ outputted from the band-pass filters 16I and 16Q is executed in conformity with the AGC voltage $V_{35}$.

Consequently, when only the digital broadcast is broadcast, or both of the analog broadcast and the digital broadcast are broadcast, the digital broadcast can be heard.

The receiving circuit shown in FIGS. 1 and 2 exhibits the structure and the operation as a receiving circuit in the double superheterodyne system when the receiving circuit receives the analog broadcast, or the FM broadcast. That is, the antenna 11 receives the broadcast wave of the IBOC system, and the received signal is supplied to the antenna tuning circuit 12 of the electronic tuning system. Then, as shown in, for example, FIG. 3A, a received signal $S_{RX}$ having target frequencies is taken out, and the received signal $S_{RX}$ is supplied to the first mixer circuits 15I and 15Q through the variable gain amplifier 13 for AGC and the interstage tuning circuit 14 of the electronic tuning system.

Moreover, the PLL 31 forms an oscillation signal (having a predetermined frequency. The formed oscillation signal is supplied to the dividing circuit 32. The dividing circuit 32 divides the supplied oscillation signal into two signals $S_{LO1I}$ and $S_{LO1Q}$ having a frequency lower than the carrier frequency $f_{RX}$ of the received signal $S_{RX}$ by a predetermined frequency $\Delta f$ (e.g. $\Delta f$=150 kHz) and having phases different from each other by an angle 90° as shown in FIG. 3C. In this case, the frequency $f_{LO}$ ($=f_{RX}-\Delta f$) of the divided signals $S_{LO1I}$ and $S_{LO1Q}$ is made to be equal to the center frequency of the digital broadcast wave signal $S_D$ on the frequency side lower than that of the analog broadcast wave signal $S_A$ between the digital broadcast wave signals $S_D$ Of the received signal $S_{RX}$.

The divided signals $S_{LO1I}$ and $S_{LO1Q}$ are supplied to the first mixer circuits 15I and 15Q, respectively, as the first local oscillation signals. Thus, the first mixer circuits 15I and 15Q execute the frequency conversion of the received signal $S_{RX}$ so that the received signals $S_{RX}$ is converted into the first intermediate-frequency signals $S_{IF1I}$ and $S_{IF1Q}$, respectively.

In this case, as shown in FIG. 3E, the first intermediate-frequency signal $S_{IF1I}$ includes an analog intermediate-frequency signal $S_{AI}$ obtained through the frequency conversion on the analog broadcast wave signal $S_A$, and a signal $S_{DX}$ obtained through the frequency conversion on the digital broadcast wave signal $S_D$. Besides, the first intermediate-frequency signal $S_{IF1Q}$ includes an analog intermediate-frequency signal $S_{AQ}$ obtained through the frequency conversion on the analog broadcast wave signal $S_A$, and the signal $S_{DX}$ obtained through the frequency conversion on the digital broadcast wave signal $S_D$.

Moreover, the intermediate frequency of the intermediate-frequency signals $S_{AI}$ and $S_{AQ}$ included in the first intermediate-frequency signals $S_{IF1I}$ and $S_{IF1Q}$ is a frequency $\Delta f$. Furthermore, in the first intermediate-frequency signals $S_{IF1I}$ and $S_{IF1Q}$, the signal $S_D$ located on a frequency side lower than that of the signal $S_A$ in the received signal $S_{RX}$ is folded back at the frequency zero as a folding center. In addition, the first intermediate-frequency signals $S_{IF1I}$ and $S_{IF1Q}$ are in-phase and quadrature signals.

Furthermore, a part of control voltage to be supplied to the variable-capacitance diode in the VCO of the PLL 31 is taken out of the PLL 31, and the taken out control voltage is supplied to the tuning circuits 12 and 14 as a tuning voltage. Thereby, the tuning to the received signal $S_{RX}$ is realized.

Then, the first intermediate-frequency signals $S_{IF1I}$ and $S_{IF1Q}$ outputted from the first mixer circuits 15I and 15Q are supplied to the band-pass filters 16I and 16Q, respectively. The band-pass filters 16I and 16Q respectively work as a first intermediate-frequency filter, as mentioned above, and have a center frequency of the intermediate frequency $\Delta f$ and a pass band equal to the occupation band of the analog intermediate-frequency signals $S_{AI}$ and $S_{AQ}$ (and the digital intermediate-frequency signals $S_{DI}$ and $S_{DQ}$), as shown by the dashed lines 6F in FIGS. 3D and 3E.

Consequently, the unnecessary signal components, such as the signal $S_{DX}$ and an adjacent disturbance wave signal, of the first intermediate-frequency signals $S_{IF1I}$ and $S_{IF1Q}$, which exist outside of the pass band of the band-pass filters 16I and 16Q, are removed by the band-pass filters 16I and 16Q, and the analog intermediate-frequency signals $S_{AI}$ and $S_{AQ}$ are taken out of the filters 16I and 16Q, respectively, as the output signals $S_{1I}$ and $S_{1Q}$ thereof.

Next, the output signals $S_{1I}$ and $S_{1Q}$ (=$S_{AI}$, $S_{AQ}$) outputted from the filters 16I and 16Q are supplied to the A/D conversion circuits 21I and 21Q through the variable gain amplifiers 17I and 17Q, respectively. The A/D conversion circuits 21I and 21Q execute A/D conversions of the supplied signals $S_{1I}$ and $S_{1Q}$ to convert the supplied signals $S_{1I}$ and $S_{1Q}$ to digital intermediate-frequency signals $S_{1I}$ and $S_{1Q}$, respectively. The signals $S_{1I}$ and $S_{1Q}$ after the A/D conversions are supplied to second mixer circuits (22II, 22IQ) and (22QQ, 22QI), respectively. Besides, the frequencies of the second local oscillation signals $S_{LO2I}$ and $S_{LO2Q}$ are made to be the frequency $\Delta f$ (=150 kHz).

Thus, similarly to the aforesaid case where the digital broadcast is received, the frequency conversions of the intermediate-frequency signals $S_{1I}$ and $S_{1Q}$ are performed to convert the signals $S_{1I}$ and $S_{1Q}$ into signals in the base band, i.e. second intermediate-frequency signals $S_{2I}$ and $S_{2Q}$, respectively. Then, the second intermediate-frequency signals $S_{2I}$ and $S_{2Q}$ are supplied to the demodulation circuit 25 through the low-pass filters 24I and 24Q. Then, in the demodulation circuit 25, the stereo audio signals in the FM broadcast are demodulated in a state of digital data by using a part thereof in common, and the demodulated data are supplied to the D/A conversion circuit 26. Consequently, the audio signals L and R in the FM broadcast are taken out of the D/A conversion circuit 26.

Now, at this time, the AGC voltages $V_{34}$ and $V_{35}$ are formed by the circuits 33–35 for performing AGC, similarly at the time of receiving the digital broadcast.

Consequently, when only the analog broadcast is broadcast, or both of the analog broadcast and the digital broadcast are broadcast, the analog broadcast can be heard.

The band-pass filters 16I and 16Q and the low-pass filters 24I and 24Q are composed of an active filter circuit including resistors, capacitors and operational amplifiers.

Besides, the circuits shown in FIG. 1 are made to be one chip IC except for the tuning circuits 12 and 14 and a resonance circuit of the VCO in the PLL 31. The circuits shown in FIG. 2 are also made to be one chip IC except for a resonance circuit of the second local oscillation circuit 36.

[Summarization]

The receiving circuit shown in FIGS. 1 and 2 can hear the digital broadcast and the analog broadcast of the IBOC system. Because the reception of the digital broadcast is performed in conformity with the direct conversion system, image signals are not generated in principle. Consequently, a necessary image rejection characteristic can be obtained. In addition, adjacent disturbance wave signals can be eliminated by the bandpass filters 16I and 16Q.

Furthermore, because image signal components are eliminated by twice orthogonal frequency conversions in the double superheterodyne system at the time of receiving the analog broadcast, the necessary image rejection characteristic can be obtained. In addition, adjacent disturbance wave signals can be eliminated by the band-pass filters 16I and 16Q. Consequently, the receiving circuit shown in FIGS. 1 and 2 can receive both of the digital broadcast and the analog broadcast of the IBOC system in a manner superior in the image rejection characteristic and the adjacent disturbance rejection characteristic.

Furthermore, because the image rejection characteristic at the time of receiving the digital broadcast or the analog broadcast is improved by the direct conversion processing or the double superheterodyne processing, the intermediate-frequency can be lowered as described above. Accordingly, the receiving circuit can be made to be an IC including the filters 16I and 16Q for the intermediate-frequency filtering. In addition, because almost all of the circuits can be shared for installing them in an IC, it can be realized to miniaturize the shape thereof and to lower the price thereof.

Furthermore, the frequency band width to be dealt with in the main signal lines of the first mixer circuits 15I and 15Q and the following circuits thereof are the same at the time of receiving the digital broadcast and at the time of receiving the analog broadcast. In addition, there is no necessity of switching the signal lines. Consequently, processing signals and designing an IC of the circuits become easy.

Furthermore, because the band-pass filters 16I and 16Q respectively have a characteristic for taking out the signal $S_{DI}$ or the signal $S_{AI}$ out of the first intermediate-frequency signals $S_{IF1I}$ and $S_{IF1Q}$, and the ratio band thereof does not become small, the order or the scale of the band-pass filters 16I and 16Q has no possibility to become large.

Furthermore, because the band-pass filters 16I and 16Q are used for the intermediate-frequency signal SDI at the time of receiving the digital broadcast and the intermediate-frequency signal $S_{AI}$ at the time of receiving the analog broadcast in common, the scale of the circuits can be reduced. Consequently, the fact brings about advantages in reducing the consumption current, reducing the size of the receiver, reducing the costs, and the like.

Furthermore, even if the analog broadcast wave signal $S_A$ is stopped and the frequency band of the analog broadcast wave signal $S_A$ is used for the digital broadcast in future, the receiving circuit can cope with such a case as a receiver exclusive to the digital broadcast only by modifying the passing band of the band-pass filters 16I and 16Q.

Incidentally, in the aforesaid description, the second intermediate-frequency signals $S_{2I}$ and $S_{2Q}$ outputted from the adding circuit 23I and the subtraction circuit 23Q, respectively, may be processed by circuits different at the time of receiving the digital broadcast and at the time of receiving the analog broadcast. In addition, the present invention can be applied in a case of receiving a broadcast of a band-diffused system such as OFDM and CDM and a broadcast of a modulation system such as QPSK, QAM and APSK as the digital sound broadcast.

Although the invention has been described in its preferred form with a certain degree of particularity, obviously many changes and variations are possible therein. It is therefore to be understood that the present invention may be practiced otherwise than as specifically described herein without departing from the scope and the sprit thereof.

What is claimed is:

1. A receiver for receiving a signal of a broadcast system in which a broadcast wave signal of an analog broadcast and a broadcast wave signal of a digital broadcast are transmitted in respective frequency bands adjacent to each other, the receiver comprising:

mixer means to which a received signal and a local oscillation signal are supplied for performing a frequency conversion of the received signal to an intermediate-frequency signal by using the local oscillation signal;

filter means for taking out the intermediate-frequency signal from an output signal of said mixer means; and demodulation means for taking out a signal indicating broadcast contents from the intermediate-frequency signal taken out by said filter means, wherein:

at a time of receiving the signal of the broadcast wave signal of the analog broadcast and the broadcast wave signal of the digital broadcast, a frequency of the local oscillation signal fed to the mixer means is set to a first frequency lower than a carrier frequency of the received signal by a predetermined increment that is a difference between the carrier frequency and a center frequency of the digital broadcast signal on a frequency side lower than the carrier frequency; and the signal taken out by said demodulation means is a signal indicating broadcast contents of the analog broadcast, and at a time of receiving the broadcast wave signal of the digital broadcast, the frequency of the local oscillation signal is set to a second frequency equal to the carrier frequency of the analog broadcast, so that a direct conversion is performed by said mixer means; and the signal taken out by said demodulation means is a signal indicating broadcast contents of the digital broadcast.

2. The receiver according to claim 1, wherein said filter means comprises a band-pass filter having a center frequency equal to a frequency of said intermediate-frequency signal.

3. The receiver according to claim 1, wherein said filter means comprises a band-pass filter having a center frequency equal to a frequency of a difference between said first frequency and said second frequency.

4. The receiver according to claim 1, wherein an occupation frequency band of said signal indicating the broadcast contents of the analog broadcast in said intermediate-frequency signal at the time of receiving the broadcast wave signal of the analog broadcast substantially agrees with an occupation frequency band of said signal indicating the broadcast contents of the digital broadcast in said intermediate-frequency signal at the time of receiving the broadcast wave signal of the digital broadcast.

5. The receiver according to claim 1, wherein a frequency band of said filter means at the time of receiving the broadcast wave signal of the analog broadcast substantially agrees with a frequency band of said filter means at the time of receiving the broadcast wave signal of the digital broadcast.

6. A receiver for receiving a signal of a broadcast system in which a broadcast wave signal of an analog broadcast and a broadcast wave signal of a digital broadcast are transmitted in respective frequency bands adjacent to each other, the receiver comprising:

first and second mixer means, to each of which is supplied a received signal and a local oscillation signal, wherein each performs a frequency conversion of the received signal to first and second intermediate-frequency signals having phases orthogonal to each other by using the local oscillation signal;

first and second filter means each for taking out the first and second intermediate-frequency signals from output signals of said first and second mixer means, respectively; and demodulation means for taking out a signal indicating broadcast contents from the first and second intermediate-frequency signals taken out by said first and second filter means, wherein:

at a time of receiving the signal of the broadcast wave signal of the analog broadcast and the broadcast wave signal of the digital broadcast, a frequency of the local oscillation signal fed to the first and second mixer means is set to a first frequency lower than a carrier frequency of the received signal by a predetermined increment that is a difference between the carrier frequency and a center frequency of the digital broadcast signal on a frequency side lower than the carrier; and the signal taken out by said demodulation means is a signal indicating broadcast contents of the analog broadcast, and at a time of receiving the broadcast wave signal of the digital broadcast, the frequency of the local oscillation signal is set to be a second frequency equal to the carrier frequency of the analog broadcast, so that a direct conversion is performed by said first and second mixer means; and the signal taken out by said demodulation means is a signal indicating broadcast contents of the digital broadcast.

7. The receiver according to claim 6, wherein said first and second filter means each comprise a band-pass filter having a center frequency equal to a respective frequency of said first and second intermediate-frequency signals.

8. The receiver according to claim 6, wherein said first and second filter means each comprise a band-pass filter having a center frequency equal to a frequency of a difference between said first frequency and said second frequency.

9. The receiver according to claim 6, wherein an occupation frequency band of said signal indicating the broadcast contents of the analog broadcast in said first and second intermediate-frequency signals at the time of receiving the broadcast wave signal of the analog broadcast substantially agrees with an occupation frequency band of said signal indicating the broadcast contents of the digital broadcast in said first and second intermediate-frequency signals at the time of receiving the broadcast wave signal of the digital broadcast.

10. The receiver according to claim 6, wherein a respective frequency band of said first and second filter means at the time of receiving the broadcast wave signal of the analog broadcast substantially agrees with a respective frequency band of said first and second filter means at the time of receiving the broadcast wave signal of the digital broadcast.

11. The receiver according to claim 6, wherein said local oscillation signal is a first local oscillation signal said receiver further comprising:

third and fourth mixer means, to each of which is supplied said first and second intermediate-frequency signals taken out by said first and second filter means and a second local oscillation signal, for performing a frequency conversion of the first and second intermediate-frequency signals to a base band signal respectively by using the second local oscillation signal; and means for supplying the signal indicating the broadcast contents of one of the analog broadcast and the digital broadcast in outputs of said third and fourth mixer means to said demodulation means.

12. An IC for receiving a signal of a broadcast system in which a signal of a broadcast wave signal of an analog broadcast and a broadcast wave signal of a digital broadcast are transmitted in respective frequency bands adjacent to each other, the IC comprising:

mixer means to which a received signal and a local oscillation signal are supplied for performing a frequency conversion of the received signal to an intermediate-frequency signal by using the local oscillation signal; and filter means for taking out the intermediate-frequency signal from an output signal of said mixer means, wherein:

at a time of receiving the signal of the broadcast wave signal of the analog broadcast and the signal of the broadcast wave signal of the digital broadcast, a frequency of the local oscillation signal fed to the mixer means is set to a first frequency lower than a carrier frequency of the received signal by a predetermined increment that is a difference between the carrier frequency and a center frequency of the digital broadcast signal on a frequency side lower than the carrier frequency; and at a time of receiving the broadcast wave signal of the digital broadcast, the frequency of the local oscillation signal is set to a second frequency equal to the carrier frequency of the analog broadcast, so that a direct conversion is performed by said mixer means, and a signal indicating broadcast contents of one of the analog broadcast and the digital broadcast is taken out of the intermediate-frequency signal taken out by said filter means.

13. An IC for receiving a signal of a broadcast system in which a signal of a broadcast wave signal of an analog broadcast and a broadcast wave signal of a digital broadcast are transmitted in respective frequency bands adjacent to each other, the IC comprising:

first and second mixer means, to each of which is supplied a received signal and a local oscillation signal, wherein each performs a frequency conversion of the received signal to first and second intermediate-frequency signals having phases orthogonal to each other by using the local oscillation signal; and first and second filter means for taking out the first and second intermediate-frequency signals from output signals of said first and second mixer means, respectively, wherein:

at a time of receiving the signal of the broadcast wave signal of the analog broadcast and the broadcast wave signal of the digital broadcast, a frequency of the local oscillation signal is set to a first frequency within a frequency band lower than a carrier frequency of the received signal by a predetermined increment that is a difference between the carrier frequency and a center frequency of the digital broadcast signal on a frequency side lower than the carrier frequency; and at a time of receiving the broadcast wave signal of the digital broadcast, the frequency of the local oscillation signal is set to a second frequency equal to the carrier frequency of the analog broadcast, so that a direct conversion is performed by said first and second mixer means, and a signal indicating broadcast contents of one of the analog broadcast and the digital broadcast is taken out of the first and second intermediate-frequency signals taken out by said first and second filter means.

14. The IC according to claim 13, wherein said local oscillation signal is a first local oscillation signal said receiver and further comprising:

third and fourth mixer means, to each of which is supplied said first and second intermediate-frequency signals taken out by said first and second filter means and a second local oscillation signal, and each of which performs a frequency conversion of the first and second intermediate-frequency signals to a base band signal respectively by using the second local oscillation signal; and means for taking out the signal indicating broadcast contents of one of the analog broadcast and the digital broadcast from outputs of said third and fourth mixer means.

* * * * *